United States Patent Office 3,793,404
Patented Feb. 19, 1974

3,793,404
SMOKE-RETARDANT STYRENE POLYMER COMPOSITIONS CONTAINING TETRAPHENYL LEAD
Leo P. Parts, Dayton, and John T. Miller, Jr., West Carrollton, Ohio, assignors to Monsanto Research Corporation, St. Louis, Mo.
No Drawing. Filed Dec. 29, 1972, Ser. No. 319,962
Int. Cl. C08f 45/62
U.S. Cl. 260—880 R     3 Claims

ABSTRACT OF THE DISCLOSURE

Smoke-retardant polymer compositions comprising a styrene polymer and at least a sufficient amount of tetraphenyl lead to reduce smoking.

BACKGROUND OF THE INVENTION (1) Field of the invention

Smoke-retardant polymer compositions.

(2) Description of the prior art

It has been reported that lead compounds are catalytically effective in the oxidation of graphite. (H. Amariglio and X. Duval. Carbon 4, 323, 1966 and D. W. McKee, Carbon 8, 131, 1970).

SUMMARY OF THE INVENTION

Smoke-retardant polymer compositions comprising a styrene polymer and at least a sufficient amount of lead tetraphenyl to reduce smoking.

DESCRIPTION OF THE PREFERRED EMBODIMENTS

Tetraphenyl lead should meet the following major requirements to be effective as smoke-retardants in polymers:

(1) It should be oxidatively and hydrolytically stable under the conditions of normal use of the polymers into which it is incorporated.
(2) It should be thermally stable at the polymer pyrolyisis temperature and it should volatilize with the pyrolyzate.
(3) The oxide formed from it in the flame zone should function as a catalyst for the oxidation of soot, into which it becomes incorporated in the flame.

Specifically, tetraphenyl lead that is incorporated into polymers as a smoke oxidation catalyst precursor should meet the following requiremnts:

(1) Form an oxide that is an oxidation catalyst for carbon.
(2) Be thermally stable at temperatures that prevail in the condensed phase below the flame zone.
(3) Have sufficiently high vapor pressures to vaporize at temperatures that prevail at the surface of the pyrolyzing polymer (~300 to 500° C.).
(4) Vaporize at a rate that is proportional to the rate of pyrolyzate production.
(5) Be hydrolytically stable.
(6) Have no adverse effects on the physical properties of polymers.
(7) Cause no increase of flammability.
(8) Be effective in fire-retardant-containing polymer systems.
(9) Cause no environmental problems during polymer processing nor with end-use items.

Tetraphenyl lead is effective in styrene polymers such as polystyrene, styrene/acrylonitrile copolymers, styrene/butadiene copolymers, styrene/acrylonitrile/butadiene copolymers and other styrene copolymers.

Styrene/acrylonitrile/butadiene copolymers are defined for the purpose of this application and the claims thereof to include conventional ABS plastics which are composed of styrene-acrylonitrile copolymers as a continuous phase and a dispersed phase of butadiene-acrylonitrile rubber, or a butadiene containing rubber onto which styrene-acrylonitrile monomers are grafted. (ABS Plastics, Basdekis, 1964, Preface, by Reinhold Publishing Corporation). Tetraphenyl lead is also effective in structurally modified styrene polymers in which one or more hydrogen atoms of the monomeric units have been replaced by other substituents such as alkyl groups and halogen atoms.

EXPERIMENTAL

Preparation of test materials

The additive was blended with the thermoplastic resins by milling at temperatures ranging from 130 to 160° C. The blended materials were then molded, by heating under pressure (130–160° C. and 1000–1500 p.s.i.), into ⅛-in. thick specimens. Test samples for smoke determinations were subsequently cut from these specimens.

Smoke mass measurement

Samples, ⅛-in. thick, weighing 0.50 (±0.01) gram are employed in the smoke mass determinations. The reported measurements were conducted with the Monsanto controlled environment combustion chamber. The sample is ignited with a small hydrogen torch and exposed during combustion to an energy flux of 3.7 watts/cm.$^2$ supplied by the Globar source. Air is drawn through the test chamber at a rate of 8.1 cm./sec. The smoke particles are collected on a fiberglass filter that is mounted in the exit port of the combustion chamber.

The sample, sample holder, and the fiberglas filter are weighed before and after combustion and values for the smoke mass and combustion residue are thus obtained. A minimum of three determinations are conducted with each test material.

The candidate smoke-retardant material was evaluated by its effect on smoke mass generated during burning of the polymer compositions into which it was incorporated. The effect of the smoke-retardant on the combustion residue (char) value was determined. The burning time was determined; this is inversely related to the combustion rate. The effect of the smoke-retardant additive on the flammability of polymers was also determined.

Results of experiments using tetraphenyl lead as a smoke-retardant in polymers as shown in Tables I and II.

TABLE I.—EFFECT OF TETRAPHENYL LEAD SMOKE-RETARDANT ON SMOKE MASS AND OXYGEN INDEX IN POLYSTYRENE [1]

| Additive | Additive content (wt. percent) [2] | Smoke mass measurements [3] | | | |
|---|---|---|---|---|---|
| | | Smoke (wt. percent) | Combustion residue (wt. percent) | Burning time (mins.) | Oxygen index [4] |
| None | | 21.3 | 0.2 | 1.13 | 18.1 |
| $\phi_4$Pb | 6.2 | 14.5 | 1.9 | 1.19 | 17.9 |

[1] Lustrex HF 77 marketed by Monsanto Company.
[2] Metal content 2.5 wt. percent.
[3] These measurements were made with the Monsanto controlled environment combustion chamber.
[4] ASTM D–2863–20 oxygen index is the minimum concentration of oxygen, expressed as percent by volume, in a mixture of oxygen and nitrogen which will just support combustion of a material under conditions of this method.

TABLE II.—EFFECTS OF TETRAPHENYL LEAD SMOKE-RETARDANT ON SMOKE MASS IN ABS [1,2]

| Additive | Additive content (wt. percent) | Smoke mass measurements | | |
|---|---|---|---|---|
| | | Smoke (wt. percent) | Combustion residue (wt. percent) | Burning time (mins.) |
| None | | 16.6 | 1.3 | 1.26 |
| $\phi_4$Pb | 6.2 | 5.6 | 13.6 | 1.49 |

[1] Lustran ABS 640.
[2] See footnotes 1 and 2 to table I.

Although the invention has been described in terms of specified embodiments which are set forth in consideable detail, it should be understood that this is by way of illustration only and that the invention is not necessarily limited thereto since alternative embodiments and operating techniques will become apparent to those skilled in the art in view of the disclosure. For example, glass-forming additives such as $Mg(OH)_2 + (NH_4PO_3)_n$, can be added to the polymers in sufficient amounts to reduce smoking due to smoldering combustion, and these additives are in addition to the tetraphenyl lead to reduce smoking due to flaming combustion. Of the order of about 10% by weight each of $Mg(OH)_2$ and $(NH_4PO_3)_n$ based on the polymer will normally be sufficient to substantially reduce smoking due to smoldering combustion. Accordingly, modifications are contemplated which can be made without departing from the spirit of the described invention.

What is claimed is:

1. A smoke-retardant polymer composition comprising a styrene polymer substantially-free of halogen and at least a sufficient amount of tetraphenyl lead to reduce smoking.

2. A composition of claim 1 wherein said polymer is polystyrene.

3. A composition of claim 1 wherein said polymer is an acrylonitrile/butadiene/styrene copolymer.

References Cited
UNITED STATES PATENTS
3,050,510   8/1962   Canterino et al. ____ 260—93.5

HOSEA E. TAYLOR, Primary Examiner

V. P. HOKE, Assistant Examiner

U.S. Cl. X.R.

260—45.75 R, 45.7 R, 45.9 R